United States Patent
Topolkaraev et al.

(10) Patent No.: US 7,704,341 B2
(45) Date of Patent: Apr. 27, 2010

(54) METHOD AND APPARATUS FOR MECHANICALLY BONDING MATERIAL WEBS

(75) Inventors: Vasily Aramovich Topolkaraev, Appleton, WI (US); Barton Andrew Laughlin, Hortonville, WI (US); John Ford Condron, Neenah, WI (US); Patrick Martin Downey, Clinton, UT (US); Thomas David Ehlert, Neenah, WI (US); Dennis Y. Lee, Cummings, GA (US); Patrick Sean McNichols, Hortonville, WI (US); Nagabhusan Senapati, Appleton, WI (US); Palani Raj Ramaswami Wallajapet, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1006 days.

(21) Appl. No.: 11/304,124

(22) Filed: Dec. 15, 2005

(65) Prior Publication Data

US 2007/0137762 A1   Jun. 21, 2007

(51) Int. Cl.
*B32B 37/00* (2006.01)
(52) U.S. Cl. .................. 156/73.1; 156/555; 156/580.2; 156/582
(58) Field of Classification Search .............. 156/64, 156/73.1, 555, 580.1, 580.2, 582
See application file for complete search history.

(56) References Cited

U.S. PATENT DOCUMENTS

| | | |
|---|---|---|
| 3,338,992 A | 8/1967 | Kinney |
| 3,341,394 A | 9/1967 | Kinney |
| 3,502,538 A | 3/1970 | Petersen |
| 3,502,763 A | 3/1970 | Hartmann |
| 3,542,616 A | 11/1970 | Dobo et al. |
| 3,692,618 A | 9/1972 | Dorschner et al. |
| 3,802,817 A | 4/1974 | Matsuki et al. |
| 3,849,241 A | 11/1974 | Butin et al. |
| 4,340,563 A | 7/1982 | Appel et al. |
| 4,919,738 A | 4/1990 | Ball et al. |
| 5,087,320 A | 2/1992 | Neuwirth |
| 5,096,532 A | 3/1992 | Neuwirth et al. |
| 5,110,403 A | 5/1992 | Ehlert |
| 5,552,013 A | 9/1996 | Ehlert et al. |

(Continued)

FOREIGN PATENT DOCUMENTS

WO    9737360 A1    10/1997

OTHER PUBLICATIONS

International Search Report for PCT/US2006/024390 dated Nov. 22, 2006, 5 pages.

*Primary Examiner*—James Sells
(74) *Attorney, Agent, or Firm*—Armstrong Teasdale, LLP

(57) ABSTRACT

In a method and apparatus for forming a bonded web comprised at least in part of a polyester, a first material web and a second material web are arranged in opposed relationship with each other at least along those portions of the first and second material webs to be bonded together. At least one of the first and second material webs is comprised at least in part of the polyester. The opposed webs are transported in a machine direction to the nip of a bonding apparatus comprised of a first bonding member and a second bonding member defining the nip therebetween for passage of the opposed first and second material webs therebetween in the machine direction. A shear force is applied to the webs generally in the machine direction at the nip and the webs are mechanically bonded together at the nip while the shear force is applied to webs.

42 Claims, 2 Drawing Sheets

U.S. PATENT DOCUMENTS

| | | |
|---|---|---|
| 5,817,394 A | 10/1998 | Alikhan et al. |
| 6,176,952 B1 * | 1/2001 | Maugans et al. ............ 156/73.1 |
| 6,537,403 B1 | 3/2003 | Blenke et al. |
| 6,613,171 B2 | 9/2003 | McNichols et al. |
| 6,620,270 B2 | 9/2003 | Ehlert et al. |
| 7,056,404 B2 * | 6/2006 | McFall et al. ................ 156/209 |

* cited by examiner

METHOD AND APPARATUS FOR MECHANICALLY BONDING MATERIAL WEBS

BACKGROUND

This invention relates generally to the mechanical bonding together of two or more material webs, and more particularly to apparatus and methods for increasing the bond strength between mechanically bonded web materials.

Mechanical bonding is a conventional bonding technique used to quickly bond together two or more webs or layers of material. One example of a mechanical bonding technique is commonly referred to as ultrasonic bonding in which the material webs comprise at in part a thermoplastic material that when exposed to a high frequency vibration, such as ultrasonic vibration, the thermoplastic materials of each web are heated, slightly melted and flow into each other to form a mechanical and/or chemical bond to hold the two webs together. As an example, ultrasonic bonding is common in the manufacturing of absorbent articles, which find widespread use as personal care products such as diapers, children's toilet training pants, adult incontinence garments, sanitary napkins and medical garments and the like, as well as surgical bandages and sponges.

One commonly employed ultrasonic bonding apparatus includes a rotatably driven ultrasonic horn and a corresponding rotatably driven anvil in closely spaced relationship with the horn to define a nip therebetween. In some ultrasonic bonding apparatus the anvil and horn contact each other at the nip while in other ultrasonic bonding apparatus typically referred to as a fixed gap, or non-contact ultrasonic bonding apparatus the anvil and horn are held in spaced relationship with each other at the nip. Two or more material webs that are to be bonded together are fed to the nip in opposed (e.g., overlaid) relationship. As the webs pass through the nip, the ultrasonic horn is excited at an ultrasonic frequency, typically in the range of about 15 kHz to about 40 kHz to ultrasonically bond the material webs together.

Because the ultrasonic vibration quickly heats and sufficiently melts the material webs to bond the webs together, high speed manufacturing is possible. For example, the material webs can be fed to the nip between the horn and anvil at speeds of at least 100 feet per minute and it is commonly faster, such as 800 feet per minute, 1,000 feet per minute or more. The linear speeds of the horn and anvil, i.e., the tangential speeds of the horn and anvil at the nip, typically match the rate at which the material webs are fed to the nip.

With recent advancements toward the use of more biodegradable materials in absorbent products, materials such as polylactic acid fibers may now be used in forming material webs for disposable absorbent articles. Polylactic acid fibers are generally known to have a relatively high stiffness and resiliency, a narrow softening range (also referred to herein as a melting band), and a high glass transition temperature as compared to more commonly used thermoplastic materials. One drawback that has come about as a result of shifting toward such materials is that these materials are less susceptible to being ultrasonically bonded together using existing bonding approaches.

SUMMARY

A method according to one embodiment for forming a bonded web comprised at least in part of a polyester generally comprises arranging a first material web and a second material web in opposed relationship with each other at least along those portions of the first and second material webs to be bonded together. At least one of the first material and the second material is comprised at least in part of the polyester. The opposed first and second material webs are transported in a machine direction to the nip of a bonding apparatus comprised of a first bonding member and a second bonding member defining the nip therebetween for passage of the opposed first and second material webs therebetween in the machine direction. A shear force is applied to the first and second material webs generally in the machine direction at the nip formed between the first and second bonding members. The first and second material webs are mechanically bonded together at the nip while the shear force is applied to the first and second material webs at the nip.

In another embodiment, a method of mechanically bonding together a first material web and a second material web in a rotary bonding apparatus comprised of a rotatable first bonding member and a rotatable second bonding member generally comprises arranging first and second material webs in opposed relationship with each other at least along those portions of the first and second material webs to be bonded together. The opposed first and second material webs are transported in a machine direction to a nip formed between the first and second bonding members for passage therebetween in the machine direction. The first bonding member is rotated to define a linear speed of the first bonding member tangent to the first bonding member at the nip and the second bonding member is rotated to define a linear speed of the second bonding member tangent to the second bonding member at the nip. The linear speed of the first bonding member is in the range of about 8 percent to about 100 percent greater than the linear speed of the second bonding member. At least one of the first and second bonding members is operated to mechanically bond together the first and second material webs at the nip.

In yet another embodiment, a method of mechanically bonding together a first material web and a second material web in a rotary bonding apparatus comprised of a rotatable first bonding member and a rotatable second bonding member generally comprises arranging first and second material webs in opposed relationship with each other at least along those portions of the first and second material webs to be bonded together. The opposed first and second material webs are transported in a machine direction to a nip formed between the first and second bonding members for passage therebetween in the machine direction. The first bonding member is rotated to define a linear speed of the first bonding member tangent to the first bonding member at the nip and the second bonding member is rotated to define a linear speed of the second bonding member tangent to the second bonding member at the nip. The linear speed of the first bonding member is in the range of about 8 percent to about 100 percent less than the linear speed of the second bonding member. At least one of the first and second bonding members is operated to mechanically bond together the first and second material webs at the nip.

In still another embodiment, a method of mechanically bonding together a first material web and a second material web in a rotary bonding apparatus comprised of a rotatable first bonding member and a rotatable second bonding member generally comprises arranging first and second material webs in opposed relationship with each other at least along those portions of the first and second material webs to be bonded together. The opposed first and second material webs are transported in a machine direction to a nip formed between the first and second bonding members for passage therebetween in the machine direction. The first bonding member is rotated to define a linear speed of the first bonding member tangent to the first bonding member at the nip and the second bonding member is rotated to define a linear speed of the second bonding member tangent to the second bonding member at the nip. The linear speed of the first bonding member is different from the linear speed of the second bonding member by a difference in the range of about 5 feet per minute (1.53 meters per minute) to about 2,000 feet per minute (610 meters per minute). At least one of the first and second bonding members is operated to mechanically bond together the first and second material webs at the nip.

BRIEF DESCRIPTION OF THE DRAWINGS

Corresponding reference characters indicate corresponding parts throughout the drawings.

DETAILED DESCRIPTION

Figure 1:
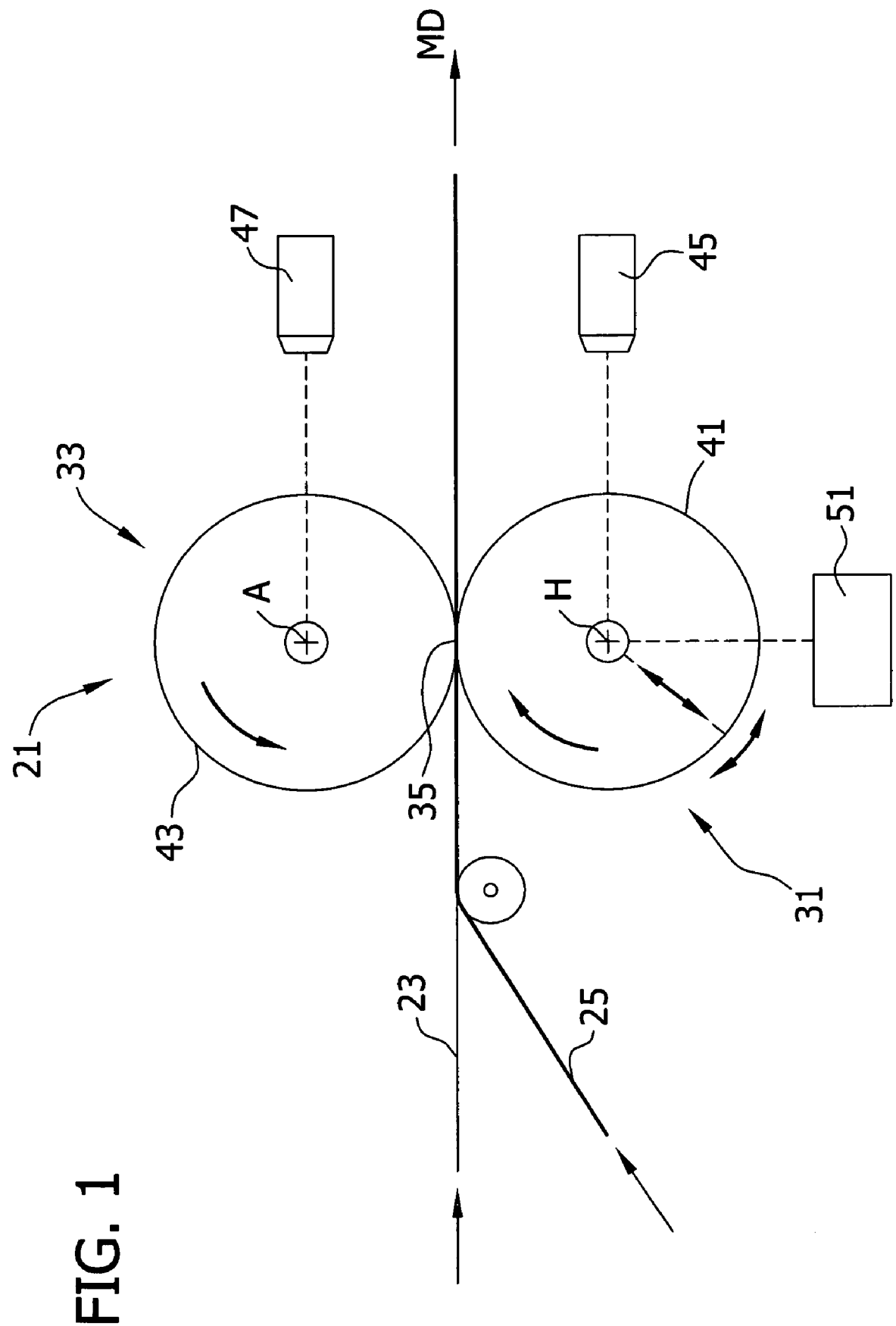
FIG. 1 is a schematic side elevation of one embodiment of a mechanical bonding apparatus with discrete material webs being delivered to the bonding apparatus.

With reference now to the drawings and in particular to FIG. 1, a mechanical bonding apparatus and method in accordance with the present invention is suitable for mechanically bonding together two or more material webs. Such bonded webs are commonly used in making absorbent articles and garments such as, without limitation, diapers, training pants, feminine hygiene products, incontinence products, medical garments, surgical pads and bandages, other personal care or health care garments, swim pants, athletic clothing, pants and shorts, and the like.

The term "mechanical bonding" is used herein to refer to the use of a mechanical device that is operable to cause the bonding together (mechanical and/or chemical bonds) of the two or more material webs. For example, in the embodiment of FIG. 1, one suitable mechanical bonding apparatus is generally designated 21 and is illustrated as being used to bond together two separate material webs 23, 25, and more suitably two continuous material webs. The material webs 23, 25 are delivered to the mechanical bonding apparatus 21 in what is referred to herein as the machine direction MD. The term "machine direction" refers herein to the direction along which a particular component or material is transported or moved during manufacturing. A "cross-direction" or "transverse direction" CD lies generally in the plane of the material or component being transported or moved and is normal to the machine direction.

The two separate material webs 23, 25 are delivered by a suitable feed mechanism (not shown) as are known in the art into opposed and more suitably face-to-face contact relationship with each other generally at or at least upstream of the mechanical bonding apparatus 21 so that the two webs together are delivered in a common machine direction MD to the mechanical bonding apparatus for bonding together of the two webs. While the material webs 23, 25 of the embodiment of FIG. 1 are illustrated as being separate (i.e., discrete) webs, it is understood that the two material webs to be bonded together may be from the same, single web of material. For example, in other embodiments a single material web may be folded over upon itself to define two opposed material webs (i.e., first and second material webs) that are in opposed relationship with each other upon being delivered to the mechanical bonding apparatus 21 and bonded together without departing from the scope of this invention.

As used herein the "material web" refers to woven or knitted webs, non-woven webs, films, paper and other suitable material webs that can be mechanically bonded together. In particular embodiments, the material webs 23, 25 are suitably comprised of at least one polymeric material, and more suitably at least one thermoplastic material. As used herein, the term "thermoplastic" is meant to include polymeric materials which can be re-heated and re-melted several times without significant material degradation. Suitable thermoplastic materials include those which are predominantly amorphous; that is, materials which are comprised of a mostly random molecular structure and have a broad softening/melting temperature range.

Suitable thermoplastic materials also include those which are predominantly crystalline; that is, materials which are comprised of a mostly ordered molecular structure and a well-defined melting point. Some thermoplastic materials that are commonly utilized in forming laminated (e.g., multi-web or multi-layer) webs include, for example, polypropylene, polyethylene, polyester, Kraton® polymers, natural rubber, polyurethane, polylactic acid, nylon, and polystyrene. As used herein, natural rubber is meant to include, for example, thermal elastomers such as SIS, SBS, SEPS, SEBS, EPDM, and polyurethane.

It is contemplated herein that the first and second material webs 23, 25 that are to be bonded together may suitably be compatible thermoplastic materials to facilitate the bonding together of the webs. As used herein, the term "compatible" means that the materials have melting temperatures that do not vary by more than about 40° F., and have similar molecular structures such that upon bonding, the materials are brought together as one material without macro-separation. In one suitable embodiment the material webs 23, 25 each comprise the same thermoplastic materials. It is understood, however, that the first and second materials need not be the same material, and need not even be compatible, to remain within the scope of this invention.

In another suitable embodiment, one or both of the material webs 23, 25 comprises a non-woven fibrous web formed at least in part of thermoplastic fibers. The term "non-woven" refers to materials and webs of material which are formed without the aid of a textile weaving or knitting process. Non-woven fibrous webs may be formed by any known technique for forming non-woven webs including, without limitation, carding, air forming, air laying, wet laying, co-forming and the like. Suitable fibers may be meltblown fibers, spunbond fibers, staple (e.g., short cut) fibers or other suitable fibers.

Meltblown fibers may be formed by extruding a molten thermoplastic material through a plurality of fine, usually circular, die capillaries as molten threads or filaments into converging high velocity heated gas (e.g., air) streams which attenuate the filaments of molten thermoplastic material to reduce their diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin et al. Meltblown fibers are microfibers which may be continuous or discontinuous, are generally smaller than about 0.6 denier, and are generally self bonding when deposited onto a collecting surface.

Spunbond fibers may be formed by extruding molten thermoplastic material as filaments from a plurality of fine capillaries of a spinnerette having a circular or other configuration, with the diameter of the extruded filaments then being rapidly reduced by a conventional process such as that described in U.S. Pat. No. 4,340,563 to Appel et al., U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartmann, U.S. Pat. No. 3,502,538 to Peterson, and U.S. Pat. No. 3,542,615 to Dobo et al., each of which is incorporated herein in its entirety by reference. Spunbond fibers are generally continuous and often have average deniers larger than about 0.3, more particularly, between about 0.6 and about 10.

It is also contemplated that the fibers used in forming the material webs 23, 25 may be multi-component fibers in which two or more components are used in forming each fiber, such as in a sheath-core arrangement, island-in-a-sea arrangement or other suitable arrangement.

In one particularly suitable embodiment, one or both of the material webs 23, 25 are non-woven webs comprised at least in part of a polyester. More suitably, one or both of the webs 23, 25 may be comprised at least in part of an aliphatic polyester. Various aliphatic polyesters from which one of both webs 23, 25 may be formed include, for example, polyesteramides, polylactic acid (PLA), terpolymers based on polylactic acid, polyglycolic acid, polyalkylene carbonates (such as polyethylene carbonate), polyhydroxyalkanoates (PHA), polyhydroxybutyrates (PHB), polyhydroxyvalerates (PHV), polyhydroxybutyrate-hydroxyvalerate copolymers (PHBV), combinations thereof, and the like. Suitable examples of such aliphatic polyesters include, without limitation, polyhydroxy alkanoates such as 3-hydroxybutyrate and 3-hydroxyhexanoate as described in U.S. Pat. No. 6,013,590 (Noda) and available under the tradename Nodax™ from Procter & Gamble of Cincinnati, Ohio. Other suitable polyhydroxy alkanoates are available from Metabolix of Cambridge, Mass., USA.

Even more suitably, the material webs 23, 25 are each non-woven webs of fibers comprised of polylactic acid (PLA). The term "polylactic acid" generally refers to homopolymers of lactic acid, such as poly(L-lactic acid); poly(D-lactic acid); and poly(DL-lactic acid), as well as copolymers of lactic acid containing lactic acid as the predominant component and a small proportion of a copolymerizable comonomer, such as 3-hydroxybutyrate, caprolactone, glycolic acid, and the like.

Polylactic acid is generally prepared by the polymerization of lactic acid. However, it will be recognized by those skilled in the art that a chemically equivalent material may also be prepared by the polymerization of lactide. As used herein, therefore, the term "polylactic acid" is intended to represent the polymer that is prepared by either the polymerization of lactic acid or lactide. Any known polymerization method, such as polycondensation or ring-opening polymerization, may be used to polymerize lactic acid. In the polycondensation method, for example, L-lactic acid, D-lactic acid, or a mixture thereof is directly subjected to dehydro-polycondensation. In the ring-opening polymerization method, a lactide that is a cyclic dimer of lactic acid is subjected to polymerization with the aid of a polymerization-adjusting agent and catalyst. The lactide may include L-lactide (a dimer of L-lactic acid), D-lactide (a dimer of D-lactic acid), and DL-lactide (a condensate of L-lactic acid and D-lactic acid). These isomers may be mixed and polymerized, if necessary, to obtain polylactic acid having any desired composition and crystallinity. A small amount of a chain-extending agent (e.g., a diisocyanate compound, an epoxy compound or an acid anhydride) may also be employed to increase the molecular weight of the polylactic acid. Suitably, the weight average molecular weight of the polylactic acid is within the range of about 60,000 to about 1,000,000. The term "polylactic acid" is also intended to include copolymers of lactic acid or lactide as the predominant component and a small portion of a copolymerizable comonomer, such as 3-hydroxy buyrate, caprolactone, glycolic acid and the like.

Examples of suitable polylactic acid materials that may be utilized in forming the material webs 23, 25 include, without limitation, Biomer® (polylactic acid polymer; commercially available from Biomer, Inc., Krailling, Germany), NatureWorks® PLA Resins (polylactic acid polymer; commercially available from NatureWorks® LLC, Minneapolis, Minn.), and BAK® (polyesteramide polymer, commercially available from Bayer AG, Leverkusen, Germany).

In other suitable embodiments, the polyester material from which one or both webs 23, 25 may comprise one or more aliphatic-aromatic copolyesters such as polybutylenesuccinate/terephthalate (one suitable example being available from E.I. DuPont de Nemours, Wilmington, Del. under the tradename Biomax®), polybutyleneadipate/terephthalate (one suitable example being available from BASF of Florham Park, N.J. under the tradename Ecoflex®), polytetramethyleneadipate/terephthalate (one suitable example being known as EastarBioe and available from Novamont of Novara, Italy), and polybutyleneadipate/terephthalate (one suitable example being known as EnPol™ 8000 and available from Ire Chemical of Seoul, South Korea).

It understood that in some embodiments the polyester material may suitably be biodegradable. The term biodegradable refers to the ability of a material to degrade due to the action of naturally occurring microorganisms such as bacteria, fungi, and algae. Many aliphatic-aromatic copolyesters, and aliphatic polyesters including polyhydroxy alkanoates are biodegradable. However, the polyester material need not be biodegradable to remain within the scope of this invention.

In other suitable embodiments, the polyester material from which the webs 23, 25 are at least in part constructed may comprise polyethylene terephthalate (PET) and polypropylene terephthalate. One suitable example is available under the tradename Sorona® 3GT™ fiber by E.I. DuPont de Nemours, Wilmington, Del.

In one suitable embodiment, the polyester material from which one or both webs 23, 25 may be constructed has a relatively high stiffness and resiliency, a relatively narrow melting band, and a relatively high glass transition temperature. For example, the polyester material may suitably have a glass transition temperature of above about 35 degrees Celsius, more suitably above about 50 degrees Celsius and even more suitably above about 60 degrees Celsius. As an additional example polylactic acid (PLA) typically has a glass transition temperature of about 62 degrees Celsius. In other embodiments, the polyester material may have a glass transition temperature above about 80 degrees Celsius and may even have a glass transition temperature of up to about 150 degrees Celsius. It is understood, however, that one or both of the material webs 23, 25 may have a glass transition temperature other than as set forth above without departing from the scope of this invention.

While some polymers have relatively sharp melting points, the fusion and melting of other polymers usually occurs over a wide temperature range, or "melting band." Diffuse melting is a consequence of an impurity effect caused by differences in composition, crystallinity and sequence length of various segments of the polymer molecules. The term "melting band" is thus used herein to refer to the range over which the material from which the web 23, 25 softens, melts and fuses. Generally, polymers with broad melting bands are more easily ultrasonically bonded than polymers with narrow melting bands. The polyester material from which the webs 23, 25 may be constructed suitably have a relatively narrow melting band. For example, the polyester material may suitably have a melting band of less than about 30 degrees Celsius, more suitably less than about 15 degrees Celsius, and even more suitably less than about 7 degrees Celsius. As an example, the melting band of PLA is approximately 7.5 degrees Celsius. It is understood, though that the melting band of one or both of the material webs 23, 25 may be other than as set forth above without departing from the scope of this invention.

The melting temperature, glass transition temperature and degree of crystallinity of a material can be determined by employing differential scanning calorimetry (DSC). A suitable differential scanning calorimeter for determining melting temperatures and other melting parameters can, for example, be provided by a THERMAL ANALYST 2910 Differential Scanning Calorimeter, which has been outfitted with a liquid nitrogen cooling accessory and with a THERMAL ANALYST 2200 (version 8.10) analysis software program, both of which are available from T.A. Instruments Inc. having offices located in New Castle, Del., U.S.A. Alternatively, a substantially equivalent DSC system may be employed.

The material samples tested can be in the form of fibers or resin pellets. It is desirable to not handle the material samples directly, but rather to use tweezers or other tools, so as not to introduce anything that would produce erroneous results. The material samples are placed into an aluminum pan and weighed to an accuracy of 0.01 mg on an analytical balance. A lid is crimped over the material sample onto the pan. Typically, the resin pellets are placed directly in the weighing pan, and the fibers are cut to accommodate placement on the weighing pan and covering by the lid.

The differential scanning calorimeter is calibrated using an indium metal standard and a baseline correction is performed, as described in the operating manual for the differential scanning calorimeter. A material sample is placed into the test chamber of the differential scanning calorimeter for testing, and an empty pan is used as a reference. All testing is run with a 55 cubic centimeter/minute nitrogen (industrial grade) purge on the test chamber. For testing resin pellet samples, the heating and cooling program is a 2 cycle test that begins with an equilibration of the chamber to −25° C., followed by a first heating period at a heating rate of 20° C./minute to a temperature of 200° C., followed by equilibrating the sample at 200° C. for 3 minutes, followed by a first cooling period at a cooling rate of 20° C./minute to a temperature of −25° C., followed by equilibrating the sample at −25° C. for 3 minutes, and then a second heating period at a heating rate of 20° C./minute to a temperature of 200° C. For testing fiber samples, the heating and cooling program is a single cycle test that begins with an equilibration of the chamber to −25° C., followed by a heating period at a heating rate of 20° C./minute to a temperature of 200° C., followed by equilibrating the sample at 200° C. for 3 minutes, followed by a cooling period at a cooling rate of 20° C./minute to a temperature of −25° C. All testing is run with a 55 cm$^3$/minute nitrogen (industrial grade) purge on the test chamber.

In another embodiment, the polyester material from which the webs 23, 25 may be constructed may exhibit a DSC melting peak endotherm, which has a distinctive width-value, and the melting peak endotherm may have a total width-value determined at a half-peak height of the melting peak endotherm. As an example, PLA fiber materials may suitably have a width-value of at least about 7° C. The endotherm width value may alternatively be at least about 9° C., and in other embodiments it may suitably be about 11° C. or more to provide improved effectiveness.

It is also contemplated that additional components may be combined with the polyester material to generally soften (e.g., reduce the stiffness of) the web 23, 25. For example, in one embodiment the material webs 23, 25 may be formed at least in part of fibers containing approximately 95 percent (by weight) polylactic acid and 5 percent (by weight) polyethylene glycol.

In accordance with one embodiment of the mechanical bonding apparatus 21 and method for mechanically bonding together two material webs 23, 25, the mechanical bonding apparatus is suitably operable to apply a shear force to the material webs as the webs are moving in the machine direction MD and being bonded together by the mechanical bonding apparatus. In particular, the shear force is suitably applied to the material webs 23, 25 generally parallel to the machine direction MD (e.g., in the planes of the webs) as the webs are moving in the machine direction and being bonded together by the mechanical bonding apparatus 21.

In the illustrated embodiment, the mechanical bonding apparatus 21 suitably comprises a first bonding member, generally indicated at 31, and more suitably a first rotary bonding member, and a second bonding member, generally indicated at 33, and more suitably a second rotary bonding member in opposed relationship with the first rotary bonding member to define a nip 35 therebetween through which the material webs 23, 25 pass for bonding together by the first and second bonding members. In a particularly suitable embodiment, the mechanical bonding apparatus 21 is a rotary ultrasonic bonding apparatus wherein the first bonding member 31 comprises a rotary ultrasonic horn 41 and the second bonding member 33 comprises a corresponding rotary anvil member 43.

It is understood, however, that the mechanical bonding apparatus 21 need not be an ultrasonic bonding apparatus. For example, the mechanical bonding apparatus 21 may suitably be a thermal bonding apparatus in which one or both of the first and second bonding members 31, 33 are heated to bond the material webs 23, 25 together, a pressure bonding apparatus or other suitable bonding apparatus in which the webs to be bonded together pass through a nip formed between first and second bonding members.

In the illustrated embodiment, a suitable drive mechanism 45 is drivingly connected to the horn 41 to rotate the horn on a horn rotation axis H. A suitable anvil drive mechanism 47 may be drivingly connected to the anvil to rotate the anvil on an anvil rotation axis A parallel to the horn rotation axis H. In a particularly suitable embodiment the horn drive mechanism 45 and the anvil drive mechanism 47 are operable to drive rotation of the respective horn 41 and anvil 43 to counter-rotate with respect to each other. For example, as illustrated by the direction arrows provided for the horn 41 and anvil 43 in FIG. 1, the horn may be rotatably driven to rotate in a clockwise direction while the anvil is rotatably driven to rotate in a counter-clockwise direction. In this manner the tangential velocity of the horn 41 and the tangential velocity of the anvil 43 at the nip 35 defined therebetween is generally in the machine direction MD.

Figure 2:
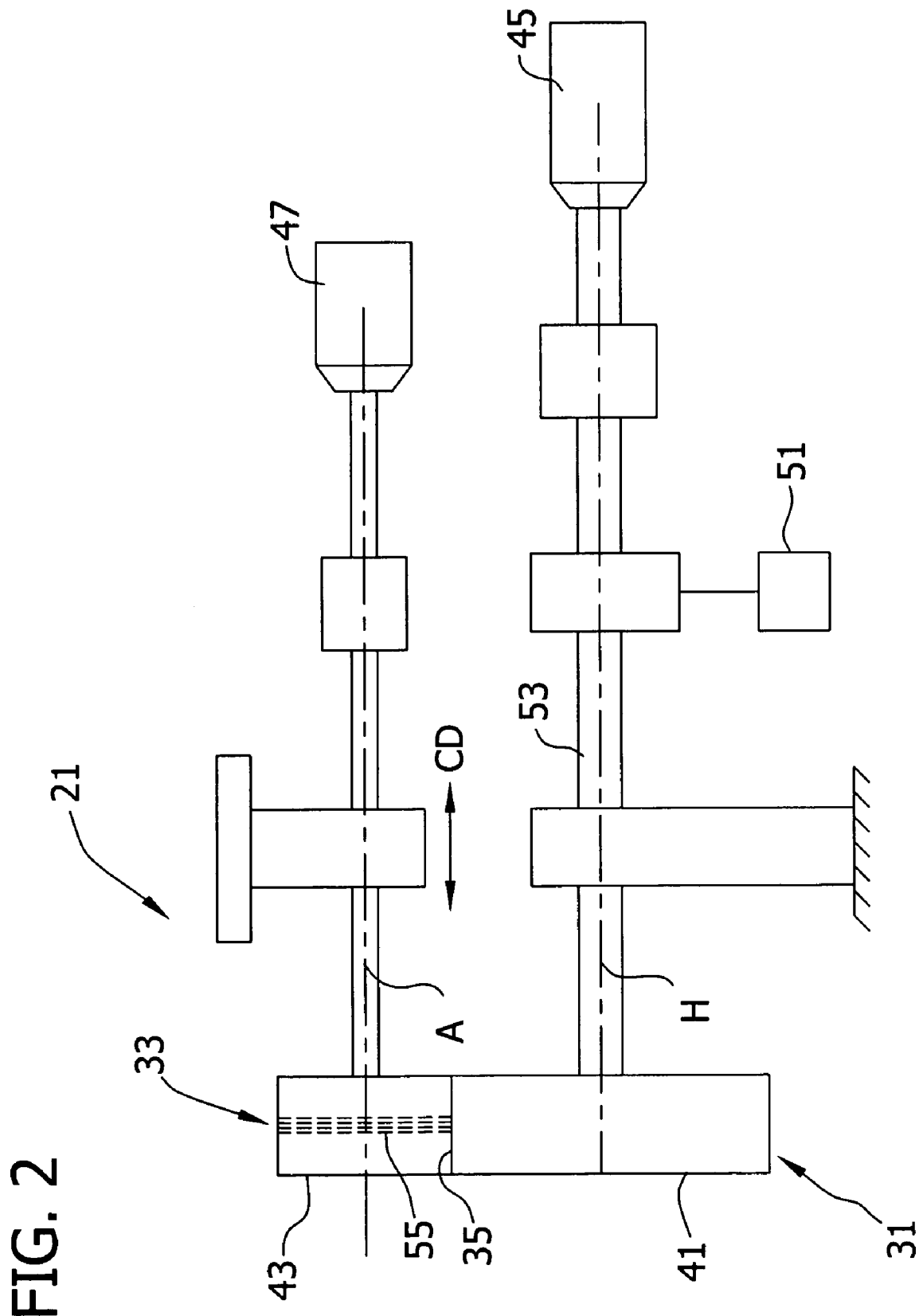
FIG. 2 is a schematic side elevation of the mechanical bonding apparatus of FIG. 1.

While the horn 41 and anvil 43 suitably have separate and independent drive mechanisms 45, 47 as illustrated in FIGS. 1 and 2, it is understood that the horn and anvil may share a common drive mechanism. Operations and construction of suitable drive mechanisms 45, 47 for the horn 41 and anvil 43 are known to those skilled in the art and are not described further herein except to the extent necessary to describe the present embodiments. For example, suitable drive mechanisms 45, 47 include, without limitation, take-offs from a powered line shaft, motors, engines, electric motors and like, as well as combinations thereof. It is also understood that the horn 41 may be non-rotary (i.e., non-rotating) without departing from the scope of this invention.

An ultrasonic exciter 51 is operatively connected to the horn 41 to direct a sufficient amount of ultrasonic power into the horn through suitable components such as ultrasonic waveguides, booster members and connection/transmission components. Suitable ultrasonic exciters 51, connectors, boosters and waveguides are well known the art and are available from commercial vendors. In particular, the ultrasonic exciter 51 is suitable for exciting the horn 41 to vibrate at a frequency in the range of about 10 to about 100 kHz, more suitably in the range of about 15 to about 60 kHz, and even more suitably in the range of about 20 to about 40 kHz.

In general, the ultrasonic rotary horn 41 may be made from any metal having suitable acoustical and mechanical properties. Suitable metals include titanium-based materials such as commercially pure titanium and titanium alloys such as Ti6A14V, aluminum-based materials, monel, and some alloy steels. Examples of suitable ultrasonic rotary horns are well known in the art. For example, ultrasonic rotary horns are disclosed in U.S. Pat. No. 5,096,532 entitled ULTRASONIC ROTARY HORN by Joseph G. Neuwirth et al., issued Mar. 17, 1992; U.S. Pat. No. 5,110,403 entitled HIGH EFFICIENCY ULTRASONIC ROTARY HORN by Thomas D. Ehlert, issued May. 15, 1992; U.S. Pat. No. 5,087,320 entitled ULRASONIC ROTARY HORN HAVING IMPROVED END CONFIGURATION by Joseph Neuwirth, issued Feb. 11, 1992; and U.S. Pat. No. 6,613,171 entitled ROTARY ULTRASONIC BONDER OR PROCESSOR CAPABLE OF FIXED GAP OPERATION by Patrick S. McNichols et al., issued Sep. 2, 2003, the entirety of each of these documents being incorporated herein by reference in a manner consistent herewith. The incorporation of one or more waveguides, such as provided by an axle member 53, is also well known in the art. The construction and arrangement of a suitable waveguide is conventional, and can be conducted with commonly understood techniques such as those employed for ultrasonic bonding systems.

Suitable rotatable anvils 43 are also well known in the art and are available from commercial vendors. For example, suitable rotatable anvils 43 are available from Sonobond of West Chester, Pa., and from Branson Ultrasonics of Danbury, Conn. Conventional ultrasonic exciters 51 and power sources can be employed in the present embodiments. Examples of suitable exciters 51 and power sources include, without limitation, a Model 20A3000 system available from Dukane Ultrasonics of St. Charles, Ill.; and a Model 2000CS system available from Herrmann Ultrasonics of Schaumburg, Ill.

A suitable bonding pattern 55 can be provided on the peripheral outer surface of the anvil 43 as illustrated in FIG. 2, or alternatively on the outer peripheral surface of the horn 41. The bonding pattern 55 may comprise a plurality of bonding elements, such as pins, which are configured to project substantially radially away from the peripheral outer surface of the anvil 43 in a manner well known in the art. The bonding elements may be substantially continuously or discontinuously distributed in a regular or irregular pattern across the width of the anvil 43 as well as about the circumference of the anvil.

The ultrasonic bonding apparatus 21 illustrated in FIGS. 1 and 2 is suitably what is commonly referred to as a rigid or fixed-gap rotary bonding apparatus in which the anvil 43 is maintained in sufficiently spaced relationship from the horn 41 at the nip 35 such that the anvil and horn remain out of contact with each other upon ultrasonic excitation of the horn. For example, in one embodiment the spacing between the horn 41 and anvil 43 at the nip 35 may suitably be in the range of about 0.1 mil to about 10 mil, and more suitably in the range of about 0.5 mil to about 5 mil. This spacing, however may vary depending on the combined thickness of the material webs 23, 25 delivered to the nip 35 for bonding. In particular, the spacing is suitably less than the combined thickness of the material webs 23, 25 delivered to the nip 35 so that the horn 41 and anvil 43 together apply a compression or nip force to the webs as the webs pass through the nip. As an example, the compression force may suitably be in the range of about 5 lbs (22.24 N) to about 500 lbs (2224 N) and more suitably in the range of about 10 lbs (44.5 N) to about 100 lbs (445 N). It is understood, though, that the horn 41 and anvil 43 may generally contact each other without departing from the scope of this invention.

In accordance with one embodiment of a method for bonding together two material webs, e.g., such as the webs 23, 25 of FIG. 1, the material webs are arranged in opposed relationship (and more suitably face-to-face contact) with each other and delivered to the mechanical bonding apparatus 21, such as to the nip 35 formed between the ultrasonic rotary horn 41 and the rotary anvil 43 of the illustrated embodiment. Again, the materials webs 23, 25 may be constructed of the same material, of compatible materials, or of different materials and even non-compatible materials. A shear force is applied to the material webs 23, 25 at the nip 35 between the horn 41 and anvil 43 by controlling the relationship between the material web feed rate, the linear speed of the horn at the nip and the linear speed of the anvil at the nip. The feed rate of the material webs 23, 25, as that term is used herein, refers to the rate (also sometimes referred to as the line speed) at which the opposed (and more suitably face-to-face contacting) material webs are moving in the machine direction MD as they enter the nip 35 between the horn 41 and the anvil 43. As an example, in one embodiment the feed rate of the material webs 23, 25 at the nip 35 is suitably at least about 100 feet per minute, or fpm (30.5 meters per minute, or mpm), more suitably at least about 800 fpm (244 mpm), and even more suitably at least about 1,000 fpm (305 mpm). It is understood, though, that the feed rate of the material webs 23, 25 may be substantially higher without departing from the scope of this invention.

The linear speed of the horn 41 at the nip 35 refers to the tangential velocity of the rotating horn at the nip, which is generally in the machine direction MD at the nip. The linear speed of the anvil 43 at the nip 35 refers to the tangential velocity of the rotating anvil at the nip, which is also generally in the machine direction MD, i.e., parallel to the tangential velocity of the horn 41 at the nip. For example, in one embodiment the linear speeds of the horn 41 and anvil 43 at the nip 35 may suitably be in the range of about 100 fpm (30.5 mpm) to about 2,000 fpm (610 mpm), more suitably in the range of about 200 fpm (61 mpm) to about 1,500 fpm (457.5 mpm), and even more suitably in the range of about 400 fpm (122 mpm) to about 1,200 fpm (366 mpm). It is understood, however, that the linear speeds of the horn 41 and anvil 43 may be other than as set forth above without departing from the scope of this invention.

While the linear speed of the anvil 43 and the linear speed of the horn 41 are each generally dependent on their respective size (i.e., diameter) and rotational speed (i.e., angular velocity), it is understood that the horn and anvil need not be of the same diameter. In other embodiments, however, the horn 41 and anvil 43 may be of the same diameter within the scope of this invention. As one example, the horn may suitably have a diameter in the range of about 3 inches (7.6 centimeters) to about 8 inches (20.3 centimeters).

The shear force is suitably applied to the material webs 23, 25 at the nip 35 by controlling the feed rate of the material webs, the linear speed of the horn 41 at the nip and the linear speed of the anvil 43 at the nip so that the material web feed rate is different from at least one of the linear speed of the horn and the linear speed of the anvil. For example, in one particularly suitable embodiment the feed rate of the material webs 23, 25 is substantially equal to the linear speed of the anvil 43 at the nip 35 to inhibit tearing of the webs where the anvil is patterned as well as to properly align the bonding pattern on the anvil with the proper bonding locations on the webs where bonding location is important. The linear speed of the horn 41 at the nip 35, however, is different from the linear speed of the anvil 43 at the nip (and hence different from the feed rate of the material webs 23, 25).

In one embodiment the linear speed of the horn 41 at the nip 35 is greater than the linear speed of the anvil 43 at the nip. For example, the linear speed of the horn 41 at the nip 35 may suitably be in the range of about 8 to about 100 percent greater than the linear speed of the anvil 43 at the nip, more suitably in the range of about 8 percent to about 80 percent, even more suitably in the range of about 8 percent to about 60 percent, still more suitably in the range of about 8 percent to about 40 percent, even more suitably in the range of about 8 percent to about 25 percent and even more suitably in the range of about 8 percent to about 16 percent greater. In another example, the linear speed of the horn 41 at the nip 35 is suitably in range of about 5 fpm (1.52 mpm) to about 2,000 fpm (610 mpm) greater than the linear speed of the anvil 43, more suitably in the range of about 8 fpm (2.44 mpm) to about 320 fpm (97.6 mpm) and more suitably in the range of about 8 fpm (2.44 mpm) to about 160 fpm (48.8 mpm) greater than the linear speed of the anvil.

In another embodiment the linear speed of the horn 41 at the nip 35 is less than the linear speed of the anvil 43 at the nip. For example, the linear speed of the horn 41 at the nip 35 may suitably be in the range of about 8 to about 100 percent less than the linear speed of the anvil 43 at the nip, more suitably in the range of about 8 percent to about 80 percent, even more suitably in the range of about 8 percent to about 60 percent, still more suitably in the range of about 8 percent to about 40 percent, even more suitably in the range of about 8 percent to about 25 percent and even more suitably in the range of about 8 percent to about 16 percent less. In another example, the linear speed of the horn 41 at the nip 35 is suitably in range of about 5 fpm (1.52 mpm) to about 2,000 fpm (610 mpm) less than the linear speed of the anvil 43, more suitably in the range of about 8 fpm (2.44 mpm) to about 320 fpm (97.6 mpm) and more suitably in the range of about 8 fpm (2.44 mpm) to about 160 fpm (48.8 mpm) less than the linear speed of the anvil.

In other embodiments the feed rate of the material webs 23, 25 may suitably be substantially equal to the linear speed of the horn 41 at the nip 35 while the linear speed of the anvil 43 at the nip is different from (i.e., greater than or less than) the linear speed of the horn at the nip. For example, the differential between the linear speed of the anvil 43 and the linear speed of the horn 41 at the nip 35 may be within the ranges set forth above. It is alternatively contemplated that the linear speed of the anvil 43 and the linear speed of the horn 41 at the nip 35 may be substantially equal and the feed rate of the web materials 23, 25 may be different from the linear speeds of the anvil and horn at the nip.

Peel Test

This peel test is used to determine the bond strength between two material webs that are mechanically bonded together. The apparatus used to conduct the test suitably has a 100N load cell, such as a SINTECH 2 tester available from the Sintech Corporation of Cary, N.C. However, other suitable test apparatus includes an INSTRON Model™, available from the Instron Corporation of Canton, Mass. 02021; or the Thwing-Albert Model INTELLECTII available from the Thwing-Albert Instrument Co. of Philadelphia, Pa. The test apparatus has a pair of clamps, with each clamp comprising a pair of jaws having suitable facings for gripping the test sample, to hold the test sample in the same plane, usually vertically. In particular, each grip has a width of 3 inches (7.62 cm) and the clamps have a guage length (i.e., the spacing between the clamps at the beginning of the test) of 2 inches (5.08 cm).

Each sample to be tested is cut to a width of 3 in. (7.62 cm) and a length of about 6 inches (15.24 cm), with the bonds of the test sample oriented in the machine direction (i.e., the length of the sample is cut in the cross-direction of the bonded web, e.g., transverse to the direction in which the material webs were delivered to the bonding apparatus for bonding). The sample is oriented in the test apparatus with the bonds (e.g., the machine direction of the webs) oriented parallel to the grips of the clamps so that the peel test is conducted in the cross-direction of the bonded material webs (e.g., along the length of the sample). The material webs are initially separated by hand a sufficient amount to allow each web to be gripped by one of the respective clamps. The clamps are then moved apart at 180 degrees of separation between the two material webs and at a constant rate of 500 millimeters/minute.

The separation continues until a failure of the bonds between the two webs, or a failure of one or both of the webs, or a failure of both the bonds and the webs occurrs. The failure type is recorded as one of the following:

| Failure Mode | Definition |
| --- | --- |
| B | Bonds pulled apart with no material failure. |
| M | Material failure before the bond did. |
| M/B | A mixture of bond and material failure. |
| M(Z) | "Zipper" failure in the material; the material ripped along the bond line. |

The peak load (in lbs-force, or Newtons) achieved prior to failure was determined from the test apparatus and recorded as the peak load for the sample. Where the failure type is a bond failure, the peak load is indicative of the strength of the bond between the two material webs. In the event of a material failure, the peak load indicates only that the bond strength is at least as great as the material strength of the material webs. However, the bond strength may actually be greater than the material strength of the webs but otherwise cannot be determined because the webs fail first.

EXPERIMENT 1

An experiment was conducted to determine the effect on the strength of the bonds formed between two material webs (with each web being of the same material and construction) in a fixed-gap rotary ultrasonic bonding apparatus, such as the apparatus 21 illustrated in FIGS. 1 and 2 and described previously herein. Three different web materials were used for this experiment: 1) a 0.8 ounces per square yard, or osy (27.1 grams per square meter, or gsm), non-woven web of polylactic acid (PLA) fibers; 2) a 0.7 osy (23.7 gsm) non-woven web of fibers made from a blend of 95 percent (by weight) polylactic acid and 5 percent (by weight) polyethylene glycol (PLA/PEG); and a 0.4 osy (13.6 gsm) non-woven web of polypropylene fibers. The polyethylene glycol was added to the polylactic acid for the PLA/PEG materials webs to increase the web modulus and to create a softer web.

The experiment was conducted on a fixed-gap ultrasonic bonding apparatus having a gap (i.e., spacing between the horn and anvil) at the nip of about 2 mil. The anvil diameter was about 6.331 inches (16.08 cm) and the horn diameter was about 3.459 inches (8.79 cm). The bonding pattern on the anvil was defined by bonding pins each having a diameter of about 0.072 inches (1.82 mm). The pins were arranged in diagonal rows with five pins in closely spaced relationship with each other in each row, and the spacing between pin centers in adjacent rows being about 0.09 inches (2.29 mm). The bonding apparatus was operated at a frequency of 40 kHz and a horn vibration amplitude of about 1.08 mil. The compression force at the nip was approximately 25 lbs. (111.2 N) for all but a few of the runs that were made. Web tension in the material webs was held constant by keeping unwind tensions at their minimum settings and using the same unwinds and web path for each run.

To conduct the experiment, two separate material webs were delivered to the nip of the bonding apparatus at a feed rate substantially equal to the linear speed of the anvil. The horn was rotated in a clockwise direction and the anvil was rotated in a counter-clockwise direction so that the linear speeds of the horn and anvil were in the same direction, i.e., downstream in the machine direction. Two parameters were varied for different runs (identified as codes in the following tables) associated with each of the different web materials: 1) the feed rate at which the material webs were delivered to the nip and 2) the speed differential of the linear speed of the horn relative to the linear speed of the anvil.

Each run involved delivering the webs to the nip in opposed, face-to-face contact relationship with each other. A sufficient length of web was fed through the nip to allow the bonded web to be subsequently cut transverse to the bonded web (i.e., in the cross-direction thereof) into 20 samples each being 3 inch (7.62 cm) wide by 6 inch (15.24 cm) long samples. Each sample was subjected to the Peel Test set forth above to determine the bond strength of the sample and the results were averaged to determine the bond strength for each run. Where more than one failure mode was recorded for the different samples tested for a particular code, each failure mode that was recorded is provided in the results.

Table 1 below sets forth the schedule of runs (i.e., Codes 1-9) made for the PLA material webs, as well as the results obtained for each run. The feed rate of the material webs was either 200, 800 or 1000 fpm (61, 244 or 305 mpm) and the percent speed differential of the linear speed of the horn to the linear speed of the anvil was either 0, +/−8 or +16. As an example, where the feed rate of the material web was 1000 fpm (305 mpm), the anvil was rotated at a speed such that the linear speed of the anvil at the nip was approximately 1000 fpm (305 mpm). For a percent speed differential of +8 percent, the horn was rotated at a rotational speed at which the linear speed of the horn at the nip was about 1,080 fpm (329.4 mpm) and for a speed differential of −8 percent the horn was rotated at a rotational speed at which the linear speed of the horn at the nip was about 920 fpm (280.6 mpm).

TABLE 1

| Code | Material | Feed Rate (mpm) | Horn/Anvil Linear Speed Differential (%) | Horn/Anvil Linear Speed Differential (mpm) | Peak Load (N) | Failure Mode |
| --- | --- | --- | --- | --- | --- | --- |
| 1 | PLA | 61 | 0 | 0 | 15.6 | M |
| 2 | PLA | 244 | −8 | −20 | 10.7 | M/B; B |
| 3 | PLA | 244 | 0 | 0 | 10.7 | B; M; M/B, M(Z) |
| 4 | PLA | 244 | 8 | 20 | 11.1 | B; M/B; M(Z); M/B(Z) |
| 5 | PLA | 244 | 16 | 39 | 14.2 | M(Z) |
| 6 | PLA | 305 | −8 | −24 | 7.6 | B |
| 7 | PLA | 305 | 0 | 0 | 4.9 | B |
| 8 | PLA | 305 | 8 | 24 | 7.1 | B; M/B |
| 9 | PLA | 305 | 16 | 49 | 12.5 | M(Z); M/B |

At the relatively lower feed rate, 200 fpm (61 mpm), the peak load for the PLA material webs was 3.5 lbs (15.6 N) (Code 1) with no speed differential between the horn and the anvil linear speeds. The failure mode for these material webs indicate that the web materials failed before the bonds failed, meaning that the bond strength of the bonds between the webs was at least and mote likely greater than 3.5 lbs. Upon increasing the feed rate to 800 fpm (244 mpm) the peak load with no speed differential between the horn and anvil linear speed dropped to 2.4 lbs (10.7 N) (Code 3) and upon further increasing the feed rate to 1,000 fpm (305 mpm), the peak load with no speed differential dropped further to 1.1 lbs (4.9 N) (Code 7). Moreover, the failures incurred for Codes 3 and 7 were primarily bond failures, meaning that the bond strength substantially decreased to below the material strength of the PLA webs.

For Codes 4 and 8 the linear speed of the horn was 8 percent greater than the linear speed of the anvil. That is, at a feed rate (and anvil linear speed) of 800 fpm (61 mpm) (Code 4), the linear speed of the horn was 864 fpm (264 mpm) and at a feed rate of 1,000 fpm (305 mpm) (Code 8) the linear speed of the horn was 1,080 fpm (329 mpm). This increase in the linear speed of the horn relative to the linear speed of the anvil resulted in the peak load increasing slightly relative to Codes 3 and 7, respectively, with no speed differential. The failure mode for these codes indicates that failure was in some instances due to the bond failure and in other instances to the material failure.

For Codes 5 and 9 the linear speed of the horn was 16 percent greater than the linear speed of the anvil. That is, at a feed rate (and anvil linear speed) of 800 fpm (244 mpm)

(Code 5), the linear speed of the horn was 928 fpm (283 mpm) and at a feed rate of 1,000 fpm (305 mpm) (Code 9) the linear speed of the horn was 1,160 fpm (354 mpm). This further increase in the linear speed of the horn relative to the linear speed of the anvil resulted in the peak load increasing to approximately 3 for the higher feed rates. Moreover, the failure mode for Code 9 at the 1,000 fpm (305 mpm) feed rate indicates that failure transitioned from bond failures to primarily web failures, thereby indicating that the bond strength had increased to at least the same as and possibly greater than the material strength of the webs.

Reducing the linear speed of the horn relative to the linear speed of the anvil by 8 percent did not result in a noticeable change in bond strength at a feed rate of 800 fpm (244 mpm) (Code 2) but for a feed rate of 1,000 fpm (305 mpm) (Code 8) reducing the linear speed of the horn relative to that of the anvil by 8 percent did result in a noticeable increase in the bond strength.

Table 2 below sets forth the schedule of runs (Codes 10-17) made for the PLA/PEG material webs, as well as the results obtained for each run. The feed rate of the material webs was either 800 or 1000 fpm (244 or 305 mpm) and the percent speed differential of the linear speed of the horn to the linear speed of the anvil was either 0, ±8 or +16 percent. The results generally indicate that the PLA/PEG webs bond well with each other even without the horn/anvil linear speed differential. That is the failure mode was primarily due to the material strength and not the bond strength. However, the peak loads obtained for Codes 10, 12, 13, 14, 16 and 18 do indicate that some increase in peak load is achieved by adopting a differential between the horn and the anvil linear speeds.

TABLE 2

| Code | Material | Feed Rate (mpm) | Horn/Anvil Linear Speed Differential. | | Peak Load (N) | Failure Mode |
| --- | --- | --- | --- | --- | --- | --- |
| | | | (%) | (mpm) | | |
| 10 | PLA-PEG | 244 | −8 | −20 | 14.2 | M(Z); M |
| 11 | PLA-PEG | 244 | 0 | 0 | 12.0 | M |
| 12 | PLA-PEG | 244 | 8 | 20 | 14.2 | M; M(Z) |
| 13 | PLA-PEG | 244 | 16 | 39 | 13.3 | M(Z); M |
| 14 | PLA-PEG | 305 | −8 | −24 | 11.1 | M; M/B |
| 15 | PLA-PEG | 305 | 0 | 0 | 9.8 | M/B; B |
| 16 | PLA-PEG | 305 | 8 | 24 | 10.2 | M; M(Z) |
| 17 | PLA-PEG | 305 | 16 | 49 | 12.5 | M; M(Z) |

Table 3 below sets forth the schedule of runs (Codes 18-23) for the PP material webs, as well as the results obtained for each run. The feed rate of the material webs was either 200, 600, 800 or 1000 fpm (61, 183, 244 or 305 mpm) and the percent speed differential of the linear speed of the horn to the linear speed of the anvil was either 0 or +16. The compression force at the nip was also varied between 25 lbs (111.2 N) and 20 lbs (89 N). These codes were provided generally as controls. The results indicate that increasing the linear speed of the horn relative to the feed rate and linear of the anvil did not have a significant impact on the bond strength between the material webs.

TABLE 3

| Code | Material | Force (N) | Feed Rate (mpm) | Horn/Anvil Linear Speed Differential. | | Peak Load (N) | Failure Mode |
| --- | --- | --- | --- | --- | --- | --- | --- |
| | | | | (%) | (mpm) | | |
| 18 | PP | 111.2 | 61 | 0 | 0 | 17.8 | M(Z); M |
| 19 | PP | 111.2 | 183 | 0 | 0 | 14.7 | M(Z); M |
| 20 | PP | 111.2 | 244 | 0 | 0 | 16.0 | M(Z) |
| 21 | PP | 111.2 | 305 | 0 | 0 | 12.9 | M(Z); M/B |
| 22 | PP | 89.0 | 305 | 0 | 0 | 9.3 | B; M/B |
| 23 | PP | 89.0 | 305 | 16 | 49 | 9.3 | B; M(Z) |

Considering the results for all three types of material webs, the most significant effect of providing a differential between the linear speed of the horn and the linear speed of the anvil (and thus the feed rate of the material webs) was obtained for the PLA material webs. This suggests that for softer and less resilient webs that have a broad softening window (e.g., such as the PP webs) such a speed differential has little if any significant effect. However it is contemplated that at higher feed rates and/or higher basis weights for the material webs the speed differential may have a more pronounced effect on softer webs. For the less resilient webs such as the PLA material webs, and to some extent the PLA/PEG material webs (which are generally softer than the PLA webs but relatively more resilient than the PP webs), the shear applied to the webs at the nip as a result of the speed differential between the horn and anvil had a more pronounced effect.

As various changes could be made in the above constructions and methods, without departing from the scope of the invention, it is intended that all matter contained in the above description and shown in the accompanying drawings shall be interpreted as illustrative and not in a limiting sense.

When introducing elements of the invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed element.

What is claimed is:

1. A method of forming a bonded web comprised at least in part of a polyester, said method comprising:
    arranging a first material web and a second material web in opposed relationship with each other at least along those portions of the first and second material webs to be bonded together, at least one of said first material and said second material being comprised at least in part of the polyester;
    transporting the opposed first and second material webs in a machine direction at a linear feed rate to the nip of a bonding apparatus comprised of a first bonding member and a second bonding member defining the nip therebetween for passage of the opposed first and second material webs therebetween in said machine direction, the first bonding member moving at a first linear speed and the second bonding member moving at a second linear speed, the linear feed rate of the first and second material webs being substantially equal to one of the first linear speed of the first bonding member and the second linear speed of the second bonding member;
    applying a shear force to the first and second material webs generally in said machine direction at the nip formed between said first and second bonding members; and
    mechanically bonding together the first and second material webs at said nip while the shear force is applied to the first and second material webs at the nip.

2. The method set forth in claim 1 wherein the step of applying a shear force to the first and second material webs comprises driving the first bonding member to move generally at the first linear speed in the machine direction at said nip and driving the second bonding member to move generally at the second linear speed in the machine direction at said nip, said second linear speed being different from said first linear speed such that the first and second bonding members apply a shear force to the first and second material webs generally at the nip.

3. The method set forth in claim 2 wherein the first bonding member is a rotary bonding member, said step of driving the first bonding member to move generally at the first linear speed in the machine direction at the nip comprising rotating the rotary bonding member at a rotational speed at which the tangential speed of the rotary bonder at the nip defines said first linear speed.

4. The method set forth in claim 3 wherein the first bonding member is a first rotary bonding member, the second bonding member being a second rotary bonding member, said step of driving the second bonding member to move generally at the second linear speed in the machine direction at the nip comprising rotating the second rotary bonding member at a rotational speed at which the tangential speed of the second rotary bonding member at the nip defines said second linear speed.

5. The method set forth in claim 4 wherein the rotational speed of the first rotary member is different from the rotational speed of the second rotary member.

6. The method set forth in claim 4 wherein the first bonding member comprises a rotary ultrasonic horn and the second bonding member comprises an anvil, the step of mechanically bonding together the first and second material webs at the nip comprising ultrasonically exciting the ultrasonic horn as the first and second web materials pass through the nip between the ultrasonic horn and the anvil.

7. The method set forth in claim 1 wherein the polyester comprises an aliphatic polyester.

8. The method set forth in claim 7 wherein the aliphatic polyester comprises polylactic acid.

9. The method set forth in claim 1 wherein the polyester has a glass transition temperature above 35 degrees Celsius.

10. The method set forth in claim 9 wherein the polyester has a glass transition temperature above 50 degrees Celsius.

11. The method set forth in claim 10 wherein the polyester has a glass transition temperature above 60 degrees Celsius.

12. The method set forth in claim 11 wherein the polyester has a glass transition temperature above 80 degrees Celsius.

13. The method set forth in claim 1 wherein the polyester has a glass transition temperature in the range of above 35 degrees Celsius to about 150 degrees Celsius.

14. The method set forth in claim 1 wherein the first material web and the second material web are constructed of substantially the same material.

15. The method set forth in claim 1 wherein the step of transporting the opposed first and second material webs in a machine direction to the nip comprises transporting said material webs to the nip at the feed rate of at least about 100 feet per minute (30.5 meters per minute).

16. The method set forth in claim 15 wherein the feed rate is at least about 800 feet per minute (244 meters per minute).

17. The method set forth in claim 16 wherein the feed rate is at least about 1,000 feet per minute (305 meters per minute).

18. The method set forth in claim 4 wherein the horn and anvil are spaced from each other at the nip a distance in the range of about 0.1 mil to about 10 mil.

19. The method set forth in claim 1 wherein the polyester has a melting band of less than about 30 degrees Celsius.

20. The method set forth in claim 19 wherein the polyester has a melting band of less than about 15 degrees Celsius.

21. The method set forth in claim 20 wherein the polyester has a melting band of less than about 7 degrees Celsius.

22. A method of mechanically bonding together a first material web comprising polylactic acid and a second material web comprising polylactic acid in a rotary bonding apparatus comprised of a rotatable first bonding member and a rotatable second bonding member, said method comprising:
    arranging first and second material webs in opposed relationship with each other at least along those portions of the first and second material webs to be bonded together;

transporting the opposed first and second material webs in a machine direction at a linear feed rate of at least 400 feet per minute to a nip formed between the first and second bonding members for passage therebetween in said machine direction;

rotating the first bonding member to define a linear speed of the first bonding member tangent to the first bonding member at the nip;

rotating the second bonding member to define a linear speed of the second bonding member tangent to the second bonding member at the nip, the linear speed of the first bonding member being in the range of about 8 percent to about 100 percent greater than the linear speed of the second bonding member; and operating at least one of the first and second bonding members to mechanically bond together the first and second material webs at said nip.

23. The method set forth in claim 22 wherein the linear speed of the first bonding member is in the range of about 8 percent to about 80 percent greater than the linear speed of the second bonding member.

24. The method set forth in claim 23 wherein the linear speed of the first bonding member is in the range of about 8 percent to about 60 percent greater than the linear speed of the second bonding member.

25. The method set forth in claim 24 wherein the linear speed of the first bonding member is in the range of about 8 percent to about 40 percent greater than the linear speed of the second bonding member.

26. The method set forth in claim 25 wherein the linear speed of the first bonding member is in the range of about 8 percent to about 25 percent greater than the linear speed of the second bonding member.

27. The method set forth in claim 26 wherein the linear speed of the first bonding member is in the range of about 8 percent to about 16 percent greater than the linear speed of the second bonding member.

28. The method set forth in claim 22 wherein the first bonding member comprises a rotary ultrasonic horn and the second bonding member comprises a rotary anvil, the step of mechanically bonding together the first and second material webs at the nip comprising ultrasonically exciting the ultrasonic horn as the first and second web materials pass through the nip between the ultrasonic horn and the anvil.

29. The method set forth in claim 22 wherein the step of transporting the opposed first and second material webs in a machine direction to the nip comprises transporting said material webs to the nip at a feed rate substantially equal to one of the linear speed of the first bonding member and the linear speed of the second bonding member.

30. The method set forth in claim 29 wherein the step of transporting the opposed first and second material webs in a machine direction to the nip comprises transporting said material webs to the nip at a feed rate substantially equal to the linear speed of the second bonding member.

31. A method of mechanically bonding together a first material web and a second material web in a rotary bonding apparatus comprised of a rotatable first bonding member and a rotatable second bonding member, said method comprising:

arranging first and second material webs in opposed relationship with each other at least along those portions of the first and second material webs to be bonded together;

transporting the opposed first and second material webs in a machine direction at a linear feed rate to a nip formed between the first and second bonding members for passage therebetween in said machine direction;

rotating the first bonding member to define a linear speed of the first bonding member tangent to the first bonding member at the nip;

rotating the second bonding member to define a linear speed of the second bonding member tangent to the second bonding member at the nip, the linear speed of the first bonding member being in the range of about 8 percent to about 100 percent less than the linear speed of the second bonding member; and operating at least one of the first and second bonding members mechanically bond together the first and second material webs at said nip, wherein the linear feed rate is substantially equal to one of the linear speed of the first bonding member and the linear speed of the second bonding member.

32. The method set forth in claim 31 wherein the linear speed of the first bonding member is in the range of about 8 percent to about 80 percent less than the linear speed of the second bonding member.

33. The method set forth in claim 32 wherein the linear speed of the first bonding member is in the range of about 8 percent to about 60 percent less than the linear speed of the second bonding member.

34. The method set forth in claim 33 wherein the linear speed of the first bonding member is in the range of about 8 percent to about 40 percent less than the linear speed of the second bonding member.

35. The method set forth in claim 34 wherein the linear speed of the first bonding member is in the range of about 8 percent to about 25 percent less than the linear speed of the second bonding member.

36. The method set forth in claim 35 wherein the linear speed of the first bonding member is in the range of about 8 percent to about 16 percent less than the linear speed of the second bonding member.

37. The method set forth in claim 31 wherein the first bonding member comprises a rotary ultrasonic horn and the second bonding member comprises a rotary anvil, the step of mechanically bonding together the first and second material webs at the nip comprising ultrasonically exciting the ultrasonic horn as the first and second web materials pass through the nip between the ultrasonic horn and the anvil.

38. The method set forth in claim 31 wherein the step of transporting the opposed first and second material webs in a machine direction to the nip comprises transporting said material webs to the nip wherein the feed rate is substantially equal to the linear speed of the second bonding member.

39. A method of mechanically bonding together a first material web and a second material web in a rotary bonding apparatus comprised of a rotatable first bonding member and a rotatable second bonding member, said method comprising:

arranging first and second material webs in opposed relationship with each other at least along those portions of the first and second material webs to be bonded together;

transporting the opposed first and second material webs in a machine direction at a linear feed rate to a nip formed between the first and second bonding members for passage therebetween in said machine direction;

rotating the first bonding member to define a linear speed of the first bonding member tangent to the first bonding member at the nip;

rotating the second bonding member to define a linear speed of the second bonding member tangent to the second bonding member at the nip, the linear speed of the first bonding member being different from the linear speed of the second bonding member by a difference in the range of about 5 feet per minute (1.53 meters per minute) to about 2,000 feet per minute (610 meters per minute); and operating at least one of the first and second bonding members to mechanically bond together the first and second material webs at said nip, wherein the linear feed rate is equal to one of the linear speed of the first bonding member and the linear speed of the second bonding member.

40. The method set forth in claim 39 wherein the linear speed of the first bonding member is different from the linear speed of the second bonding by a difference in the range of about 8 feet per minute (2.44 meters per minute) to about 320 feet per minute (97.6 meters per minute).

41. The method set forth in claim 40 wherein the linear speed of the first bonding member is different from the linear speed of the second bonding by a difference in the range of about 8 feet per minute (2.44 meters per minute) to about 160 feet per minute (48.8 meters per minute).

42. The method set forth in claim 39 wherein the linear speed of the first bonding member is greater than the linear speed of the second bonding member.

* * * * *